Aug. 11, 1953 E. R. MAURER 2,648,414
DRIVE CONTROL MECHANISM
Filed Dec. 18, 1947 2 Sheets-Sheet 1
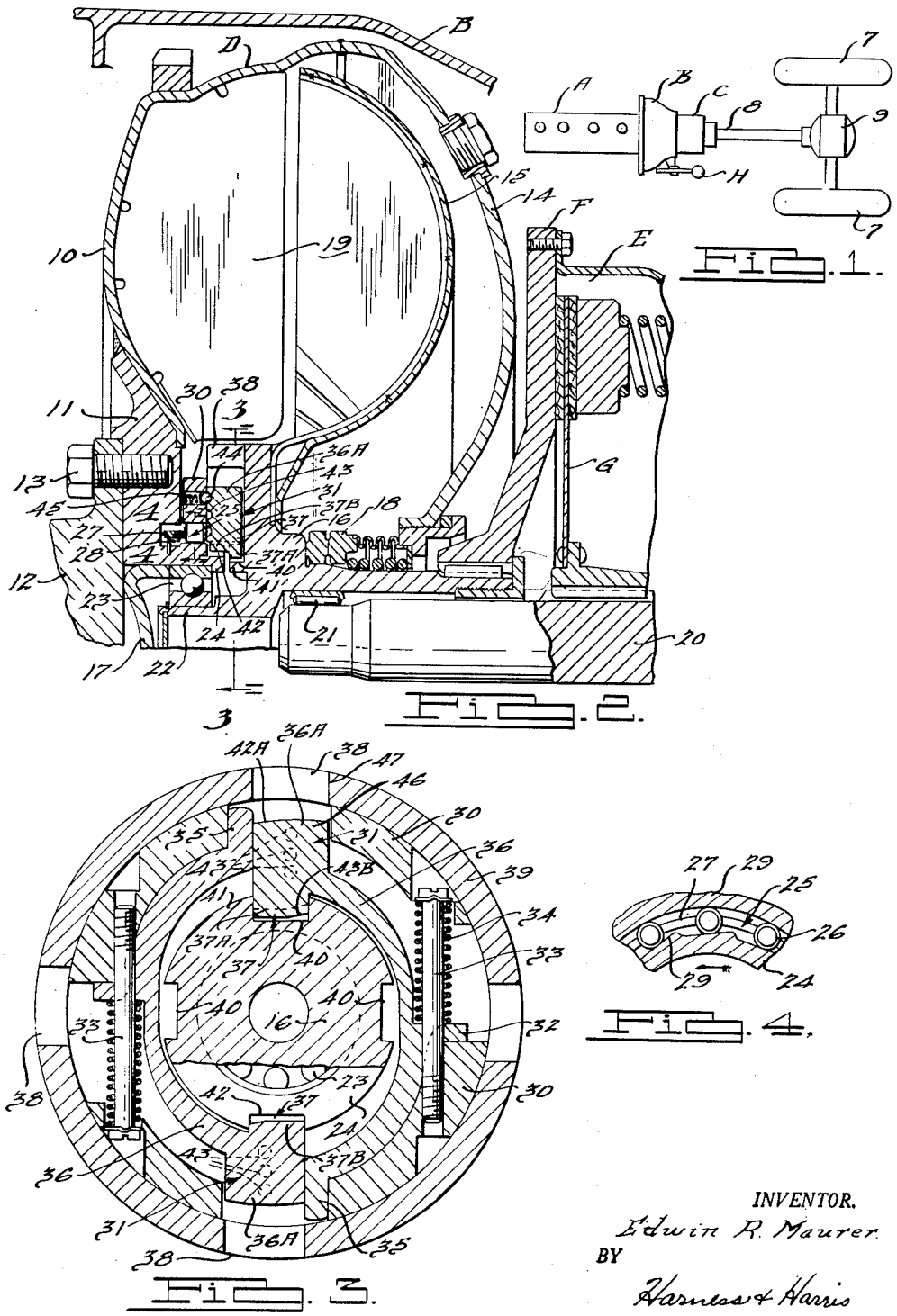
INVENTOR.
Edwin R. Maurer
BY
Harness & Harris
ATTORNEYS

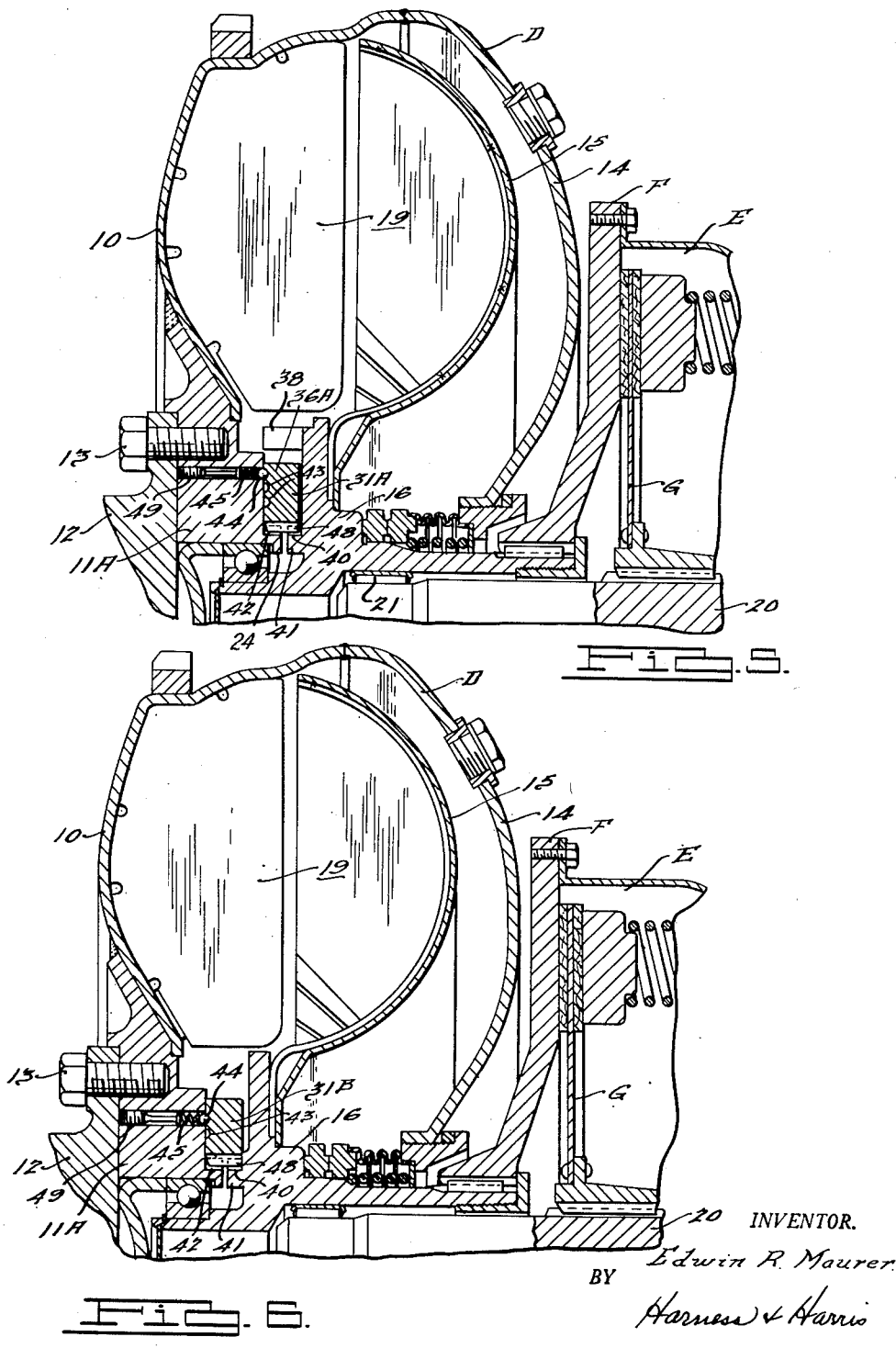

Patented Aug. 11, 1953

2,648,414

UNITED STATES PATENT OFFICE 2,648,414

DRIVE CONTROL MECHANISM

Edwin R. Maurer, Detroit, Mich., assignor to Chrysler Corporation, Highland Park, Mich., a corporation of Delaware Application December 18, 1947, Serial No. 792,466

27 Claims. (Cl. 192—3.2)

This invention relates to impositive drives and to slip coupling drives such as "fluid drives" and particularly concerns means for improving the operating efficiency, safety and characteristics of fluid drive devices for motor vehicles. The subject application is a continuation-in-part of my application Serial No. 531,867, filed April 20, 1944, now abandoned.

Fluid couplings have come into wide general use in motor vehicles for coupling the engine to the driving wheels, and hence for the purpose of illustration, my invention will be described as applied to fluid couplings.

The usual fluid coupling consists of a driving element or "impeller," and a driven member of "runner." The two are arranged in adjacent relation and operate with or without a change speed gearbox or transmission to transmit drive from the engine of the vehicle to the driving wheels.

Fluid couplings owe their popularity in large part to the slipping characteristics which permits the impeller to "slip" with respect to the runner by an amount which varies between 100% and approximately two per cent in accordance with the speed and torque difference between the two members.

This slip is advantageous at low speeds because it permits the engine to idle with the car stationary, reduces gear shifting, prevents engine stalling and provides smooth transmission of power. At high speeds the slip, even though reduced to a low value, wastes fuel and cuts down the overall efficiency of the transmission system. In a concurrently filed copending application of Edwin R. Maurer and J. Douglass Caton, Serial No. 531,868, means for eliminating the slip at speeds above predetermined idling speeds is described and claimed. Such an arrangement is advantageous, but it does not eliminate slip between the coupling members at speeds below predetermined engine idling speeds as when the vehicle is stationary.

The principal object of the present invention is to provide a simple, self-contained built-in mechanism, preferably wholly within the coupling, that operates automatically to positively lock the coupling elements together, preferably in a two-way drive, both at speeds of the engine higher than engine idling speed as well as at speeds of the engine below engine idling speed.

Another object is to provide a self-contained mechanism preferably wholly within the coupling which is adapted to automatically lock the coupling elements together in a two-way drive when the engine is brought to rest as when parking and which mechanism will be automatically released when the engine is started. The latter feature is especially desirable to a certain class of drivers who prefer to leave their cars in gear when parked as a safety measure. With the present type of slip coupling, leaving the car in gear is ineffective to prevent movement of the car because the coupling runner is free to rotate independently of the impeller. The improved arrangement about to be described makes it possible to retain this safety feature in fluid coupling cars, and in addition permits the car engine to be started by pushing the car at a low speed.

An additional object is to provide a locking mechanism of the aforesaid character including a latch positively interengageable with the coupling members which latch is arranged to engage with one of the coupling members before it engages the other.

A further object is to provide a device of the aforesaid type which is easily and cheaply manufactured, and which is foolproof in use.

Other objects and advantages of the invention will become apparent to one skilled in the art from a study of the following description when taken in connection with the accompanying drawings which illustrate a preferred embodiment of the invention.

In the drawings:

Fig. 1 is a diagrammatic showing of the power plant and drive mechanism of a vehicle incorporating the present invention;

Fig. 2 is a longitudinal vertical section of the upper portion of a fluid coupling embodying the present invention;

Fig. 3 is an enlarged section generally along the line 3—3 of Fig. 2;

Fig. 4 is an enlarged section along the line 4—4 of Fig. 2; and

Figs. 5 and 6 are views similar to that of Fig. 2 showing modifications of my invention.

Referring now to the drawings wherein similar reference characters are used to designate corresponding parts of the structure, Fig. 1 illustrates a typical arrangement of power transmission mechanism in a motor vehicle embodying the present invention. The vehicle A is coupled to the driving wheels 7 of the vehicle through a fluid power transmitting and clutch unit B shown in greater particular in Fig. 2, and a change speed gearing C to which reference is hereinafter made. As seen, the output shaft 8 of the unit C connects with the customary differential gear box 9 which in turn drives the wheels 7.

As best seen in Fig. 2, the unit B comprises a fluid power transmitting device D in the nature of a fluid coupling of the kinetic type preferably in conjunction with a releasable master friction clutch E of the conventional design, primarily employed to facilitate manual shifts in the transmission C but which may also be advantageously employed in connection with the subject invention.

The fluid coupling illustrated comprises a driving member or impeller 10 carried by a hub 11 which is fastened to an engine crankshaft 12 constituting part of the vehicle driving structure by bolts 13. The impeller includes a housing portion 14 which encloses a driven member or runner 15, the latter being welded or otherwise fastened to a hub 16. A forward seal 17 and a rear seal 18 prevent leakage of the fluid which is circulated in the passages formed by the vanes 19 as is common in the art.

The runner hub 16 is hollowed out and pilots a driven shaft 20, an anti-friction bearing 21 being disposed between the hub and shaft. The shaft is adapted to be driven by the hub 16, a driving connection being provided by means of a clutch E or other device. The clutch E comprises a driving plate F driven by the runner hub 16 and a driven clutch member G fixed on shaft 20. The master clutch is disengaged by depressing a clutch pedal H (Fig. 1). The runner hub 16 has a forward extension 22 which carries a ball bearing 23 for positioning the runner hub rotatably within the impeller hub 11.

The impeller hub 11 has a rearwardly projecting annular portion on which is formed one element 24 of a one-way roller clutch, designated 25. The clutch has the usual rollers 26 and cage 27 for positioning the rollers. A wrap-type spring 28 engages the cage and the hub 11 and energizes the clutch when the hub tends to overrun the cage in the direction of the arrow in Fig. 4, the part 24 being provided with cams 29. The other element of the clutch comprises a pawl drive plate 30 which carries a pair of pawls 31 of the "Keller" type.

The pawls 31 are radially shiftable under the influence of centrifugal force. Each pawl is provided with an integral ear 32 which slidably receives a bolt 33. The latter is rigidly held in the pawl drive plate as shown in Fig. 3, and carries a coiled compression spring 34 which controls or governs the action of the pawl and urges the pawl to the illustrated retracted position. The tension in these springs may be adjusted by the bolts 33. The pawl has a tail portion 35 which acts as a guide and the pawl is so shaped that its radial movement is limited in either direction by engagement with the plate 30 or the runner hub 16.

Each pawl is provided with a body portion 36 having an outer clutch element such as the tooth, dog, or latch 36A and an inner clutch element such as the tooth, dog, or latch tooth 37. The tooth 36A is adapted to engage openings 38 formed in the annular forwardly projecting portion 39 of the runner hub 16. The tooth 37 is adapted to engage openings 40 formed in a second annular forwardly projecting portion 41 of hub 16 and similar openings 42 formed in the portion 24 of the impeller hub 11.

As can be seen more clearly in Fig. 2, the inner teeth 37 of the pawls are of stepped construction forming a long or leading tooth portion 37A and a short or follower tooth portion 37B, such that upon inward radial movement thereof the openings 40 in the runner hub which are then nearer the teeth 37A than the openings 42 are to the teeth 37B will be engaged prior to the openings 42 in the impeller hub. Otherwise there would be instances when the teeth 37 would not engage both the runner and impeller hubs because the runner is normally stationary when the teeth engage. It will be understood that if the entrances of the slots 40, 42 were in a stepped relationship, that is, at different distances from the axis of rotation of the vaned members the pawl would not require a stepped tooth formation and a similar result to that obtained by the stepped tooth would be achieved.

The teeth 36A and 37 are cammed at 42A and 43B respectively, as illustrated such that they will smoothly engage the respective openings 38, 40, 42 when the pawls are rotating in synchronism with the hub 16, or the hub 11, or both as the case may be. Should the pawls be urged outwardly by centrifugal force or inwardly by the springs 34 at times when the parts to be engaged are not rotating synchronously, the cammed outer ends of the pawls will engage the edges of the respective openings and the pawls will be prevented from engaging the openings until the parts reach synchronism.

Each of the pawls in Fig. 2 is provided with three detent holes 43 which are adapted to receive a ball detent 44 carried by the pawl drive plate 30, the ball 44 being biased to engage the hole 43 by a spring 45. The detents prevent hunting of the pawls and tend to hold the pawls in their proper positions while the plate 30 is rotating within the desired speed ranges.

The operation of the device in Fig. 2 as so far described is as follows:

Let it be assumed that the parts are in the position illustrated with the vehicle engine, the hub 16 and the shaft 20 at rest. The engine may be started by pushing or towing the car and the engine compression may be used for braking on grades by coasting with a dead engine under these conditions because the impeller and runner are directly connected through the pawl teeth 37.

When the engine is started the pawls 31 will rotate with the crankshaft 12 being driven by plate 30 through freewheel 25 and will disengage themselves from the hub portions 24 and 41 at approximately 325 R. P. M. The retracting springs 34 and the detent springs 45 are preferably chosen such that centrifugal force on the pawls will effect their outward movement to mid-position at an engine speed of between 250 and 400 R. P. M., the engine idling speed with a warm engine being about 425 R. P. M. It is assumed that the vehicle master clutch E or other equivalent disengaging means located between the runner 15 and the drive wheels 7 will be disengaged when the engine is started or the transmission is in neutral. In such case the frictional load on the pawl teeth 37 will not be great and the pawls will disengage without difficulty.

When the pawls have moved to mid-position, the detent ball 44 engages the center hole 43 and the impeller 10 and runner 15 are free for normal operation. The vehicle may then be started, accelerated, maneuvered, etc. with the coupling elements slipping, the attendant advantages thereof being availed of.

When the vehicle has been accelerated to a predetermined cruising speed, for example, above 25 M. P. H. the pawls 31 will, under the influence of centrifugal force, tend to move outwardly to engage the openings 38. They will be prevented from entering said openings however so long as the speeds of the pawls and the hub 16 are different as they normally will be because of the slip. The driver can effect engagement of the pawls by momentarily releasing the throttle whereupon the impeller will drop off in speed relatively to the runner and the pawls will engage at the instant of synchronism.

The impeller and runner are now locked for conjoint operation through the freewheel unit 25 and pawl 31 without slippage so long as the impeller tends to overrun the runner as is the case during normal forward driving of the car by the engine. When the car tends to drive the engine above the aforesaid pawl cut-in speed, as when coasting forward, the runner 15 will overrun the impeller 10 and there will be slippage therebetween due to the presence of the one-way roller clutch 25 which acts as a one-way forward driving connection between the impeller hub and the pawl drive plate 30.

This overrunning clutch 25, while not absolutely essential, is of substantial advantage. It eliminates the possibility of damage to the pawl teeth 36A should the pawls try to engage the openings 38 when the vehicle is coasting or being towed at a speed above 25 M. P. H. (or whatever cut-in speed is chosen). Although the cammed outer ends 42A of the pawls will prevent damage thereto and effect smooth engagement when the impeller drops from a higher relative speed, when the opposite condition exists, i. e. when the runner has the higher speed as when the aforesaid coasting or towing condition exists there is danger of engagement by the high corner 46 of the pawl digging into the edge 47 of the slot 38 before synchronism with consequent damage in the absence of the overrunning clutch 25. The presence of the overrunning clutch permits the runner hub 16 to pick up the pawl without damage or ratcheting. The overrunning clutch also aids in effecting disengagement. Thus when the vehicle speed is reduced, the pawls 31 will drop out of the openings 38 at some speed below 25 M. P. H. depending upon the strength of the detent springs 34 and the frictional load on the pawls. Disengagement will be readily obtained on allowing the engine to coast since the frictional load on the pawls will, because of the presence of the overrunning clutch 25, be less when the vehicle is coasting than when the engine is driving.

The pawls will stay in mid-position and permit slippage between the coupling elements until the engine is stopped whereupon they will tend to move radially inwardly under the influence of control springs 34 as the speed of the hub 11 falls off. Because of the leader and follower tooth engagement provided by the stepped construction of the teeth 37, the pawls will engage the runner hub first then the impeller hub. Engagement of both hubs is thus assured and the two coupling elements will be locked together for two-way direct drive when the engine is dead. Should for any reason the hub 11 not be engaged by the pawl any small movement of the vehicle will bring the hub recess into alignment with the pawl and effect engagement.

It may thus be seen that the invention provides an extremely simple and foolproof means for locking the elements of a fluid coupling or fluid torque converter or other slip coupling together in a two-way drive during cruising speeds of the vehicle and when the engine is dead, thereby increasing the operating economy of the vehicle as well as providing for increased safety of operation.

The present invention is particularly advantageous when used with a transmission of the so-called "step-up on coast" type such as that described in the following patents: Syrovy et al., 2,277,799, issued March 31, 1942; Dunn et al., 2,159,429, issued May 23, 1939; and Maurer, 2,154,575, issued April 18, 1939.

In driving a vehicle equipped with one of these transmissions, the driver accelerates the car in a low speed gear ratio to a speed above the engagement speed of an automatically actuated clutch means, then releases the throttle momentarily whereupon the clutch means engages to establish a higher gear ratio (usually direct drive) during a short free-wheeling period. Further details of these transmissions can be had by reference to the above cited patents.

When the present invention is installed on a vehicle having such a transmission (or a similar type) the cut-in speed of the pawls 31 can be set to coincide with the speed of engagement of the transmission step-up clutch means whereupon simultaneous operation of the two clutch means may be obtained during one short period of throttle release. Such a combination provides extremely pleasing operation and "feel" of the vehicle without entailing any additional effort or thought on the driver's part.

In Fig. 5 I have shown a modification of my invention of Fig. 2 which utilizes the advantageous two-way locking features of my invention but wherein the overrunning clutch 25 of the Fig. 2 construction is omitted with consequent loss of its advantages. However, the arrangement is of quite simple form and may be employed where a more inexpensive construction is desired.

Thus the pawls 31A are rotatably carried by and directly driven by the hub 11A, the method of support being similar to that provided by the carrying plate 30 of Figs. 2 and 3. The pawls 31A are also of a similar character to those of Fig. 3 except that the stepped construction at the inner latching ends 37A of the pawls of Fig. 2 is omitted since the pawls 31A are carried by the hub 11A and hence are already in drive connection therewith. However, the pawl and slot arrangement on the impeller hub has been retained to avoid bending moments on the pawls in transmitting torque through the two-way tooth connection. Thus the tooth 48 is shown to engage in a slot 42 in rearwardly projecting annular portion 24 of the hub 11A. It will be understood that this tooth and slot interengagement of the pawl and impeller hub may be omitted if desired, and the pawl tooth 48 be merely interengaged with the slot 40 of the runner hub 16. It will also be noted that the Fig. 5 construction provides a set screw 49 for adjusting the tension of the detent spring 45.

The operation of the two-way locking mechanism of Fig. 5 will in general be similar to that of the Fig. 2 mechanism, the pawls 31A becoming disengaged from the runner 16 when the engine is started with the clutch E disengaged and the impeller rotated at engine idle speed. The pawls 31A will then assume an intermediate position wherein the impeller 10 may drive the runner in the normal slip coupling drive. Subsequently at a predetermined vehicle speed depending on the mass of the pawl bodies 36 and the strength of the control or governor springs 34 the pawls 31A will be urged outwardly by centrifugal force to become engaged with the slots 38 of the forwardly projecting annular portion 39 of the hub 16. Engagement will take place upon allowing the pawl-carrying impeller to coast down to the speed of the runner as by momentary release of the throttle. The pawls will remain engaged until the vehicle speed is reduced below the engaging speed of the pawls whereupon the pawls will drop out to their intermediate position upon momentary release of the engine during torque thereon as by throttle closing or release of the master clutch or other means of obtaining torque interruption.

The pawls will be slightly ramped on the drive side of their outer edge to facilitate ratcheting of the pawls when the impeller is rotating faster than the runner prior to pawl engagement. The remainder of the pawl outer edge is preferably made concentric with the axis of rotation to allow ratcheting of the pawls past the runner windows 38 under coast drive condition as when the vehicle is going down hill and the pawls are trying to engage against the slip of the coupling. This shaping of the pawl ends will also minimize opportunity for digging in under these conditions. Where the pawls are engaged and undergoing coast torque drive they will release below their engaging speed when the car speed is sufficiently reduced so that the engine again becomes the driver. Alternately pawl release may be obtained by disengaging the master clutch E.

The arrangement in Fig. 6 is one utilizing only the advantageous parking and towing features of my invention. The construction is in all respects similar to that of Fig. 5 except that the annular portion 39 of the runner hub 16 and the pawl-engaging slots 38 are omitted so that the pawls 31B in this figure will only function to lock the impeller and runner in a two-way drive when the engine is dead. In this arrangement only two detent grooves 43 are shown, one to hold the pawl engaged, the other to hold the pawl disengaged so as to avoid a hunting action between engaged and disengaged positions. These may be omitted when ratcheting of the pawls is not objectionable.

It will be understood that an overrunning clutch 25 may be incorporated into the Fig. 6 construction where desired, in the manner shown in Fig. 2 together with the leader and follower tooth engagement feature to obtain the advantages of this structure described above.

Having thus described a physical embodiment of the invention for purposes of illustration, it is to be understood that such is by way of example only and it is not intended to limit the invention in its broader aspects except as set forth in the claims appended below.

I claim:

1. In combination, a fluid drive mechanism including a pair of rotatable fluid connected members, a lock-up device for locking said members together for two-way positive drive when said members are rotating below a predetermined speed, and a second lock-up device for locking said members together when said members are rotating above a second predetermined speed.

2. In combination, a fluid drive mechanism including opposed rotatable fluid connected members, a lock-up device for locking said members together for two-way drive when said members attain a predetermined high speed, and a second lock-up device for locking said members together for two-way drive when said members attain a predetermined low speed.

3. In combination, a fluid drive mechanism including opposed rotatable fluid connected members, means operable automatically in response to synchronization in speed of the members for locking the members together at predetermined high speed thereof, and means operable automatically in response to synchronization in speed of the members for locking the members together for two-way drive at predetermined low speed thereof.

4. In combination with a vehicle having an engine and means forming a fluid coupling between a first and a second member for connecting the engine with the vehicle driving wheels, clutch means wholly within said coupling automatically operable below the engine idling speed for locking said members together in a two-way drive, said clutch means being arranged to be responsive to centrifugal force at or above engine idling speeds for effecting release of said clutch means.

5. In combination with a vehicle having a fluid drive mechanism including input and output vaned members for drivingly connecting the engine with the driving wheels in a slip drive, clutch means automatically operable below the engine idling speed for locking the said input and output members together in a two-way non-slipping drive, and clutch means automatically operable at a speed substantially in excess of engine idling speed for locking the coupling members together in a non-slipping drive by the engine.

6. In a fluid power transmitting mechanism, a first vaned member, a second vaned member adapted to be driven in a slip drive by said first vaned member through a fluid medium provided therebetween, hubs for mounting said respective members having adjacent coaxially disposed portions; a clutch member drivingly connected to one of said members and operable to provide a positive interlock between said hub portions whereby to effect conjoint rotation of said members in a two-way drive and automatically operable means for effecting disengagement of said clutch member from at least one of said hub portions at a predetermined high speed of said driving vaned member.

7. In a fluid coupling having impeller and runner members, hubs for mounting said respective members having adjacent coaxially disposed portions; a spring biased clutch member adapted to engage said hub portions and lock the same together for conjoint rotation in a two-way drive; and automatically operable means constituting a part of said clutch member for effecting disengagement of said clutch member at predetermined high speed of said impeller member.

8. In a fluid coupling having impeller and runner members, hubs for mounting said respective members having adjacent coaxially disposed portions; a clutch member adapted to be interengaged with said hub portions to lock the same together for conjoint rotation in a two-way drive; and means for automatically effecting engagement of said clutch member at a predetermined low speed and at a predetermined high speed of said impeller member.

9. In a fluid coupling having impeller and runner members, an automatic clutch including clutching means movable in a first direction in response to a first predetermined speed of said impeller to lock said members together for conjoint rotation in a two-way drive and movable in a second direction in response to another predetermined speed of said impeller to lock said members together for conjoint rotation, said means being ineffective at impeller speeds intermediate said predetermined speeds.

10. In a fluid drive mechanism, a driving member, a driven member, means for locking said driving and driven members together at a certain predetermined speed comprising a centrifugally actuated pawl; means for carrying said pawl mounted to permit relative rotation between said means and each of said members in one direction and one of said members in the other direction, means carried by said respective members adapted to be engaged by said pawl, and means for causing said pawl to engage one of said members prior to the other.

11. In a fluid drive mechanism, a driving member, a driven member, means for locking said driving and driven members together at a certain predetermined speed comprising a centrifugally actuated pawl; means for carrying said pawl mounted to permit relative rotation between said means and each of said members in one direction and one of said members in the other direction; means carried by said respective members adapted to be engaged by said pawl, and means for causing said pawl to engage said driven member prior to said driving member.

12. In a fluid drive mechanism having driving and driven members and a fluid operable therebetween as a driving means, a pawl drive plate adapted to be driven by one of the members; centrifugally actuated pawls carried by said plate; means carried by the other of said members adapted to be engaged by said pawls at relatively low and relatively high speeds of said plate but not at intermediate speeds thereof, and detent means for controlling shift of said pawls.

13. In a fluid drive mechanism having driving and driven members and a fluid operable therebetween as a driving means, a pawl drive plate adapted to be driven by one of the members; centrifugally actuated pawls carried by said plate; radially inner and outer teeth on said pawls; means on the other of said members for engaging said inner teeth at low rotational speeds thereof and means on the other of said members for engaging said outer teeth at high rotational speeds thereof, there being intermediate speeds at which said other of said members is disengaged from said inner and outer pawl teeth and detent means carried by said plate for releasably holding said pawls in their positions engaged with said inner and outer teeth and at said disengaged position.

14. In a fluid drive mechanism having vaned driving and driven members and a fluid operable therebetween as a driving means; a pawl drive plate adapted to be driven by one of the members, clutch means for providing a drive connection between said plate and said one member, centrifugally actuated pawls carried by said plate, means on the other of said members adapted to be engaged by said pawls at relatively low and relatively high speeds of said plate but not at intermediate speeds thereof for effecting a drive between said members bypassing the fluid.

15. In a fluid drive mechanism having driving and driven members and a fluid operable therebetween as a driving means, a pawl drive plate adapted to be driven by one of the members; centrifugally actuated pawls carried by said plate; radially inner and outer teeth on said pawls; means on the other of said members for engaging said inner teeth at low rotational speeds thereof and for engaging said outer teeth at high rotational speeds thereof.

16. In combination, a fluid drive mechanism including opposed rotatable fluid connected members, an automatic clutch including an element movable between a first and a second position in response to relatively high and relatively low speeds of said members, clutching means operable on said element at said first position for locking said members together for conjoint rotation at speeds over a predetermined high speed thereof and operable on said element at said second position for locking said members together for two-way conjoint rotation at speeds under a predetermined low speed thereof.

17. In combination, a fluid drive mechanism including opposed rotatable fluid connected members, an automatic clutch including clutch means operable automatically in response to synchronization in speed of the members for locking the members together for conjoint rotation in a two-way drive at speeds over a predetermined high speed thereof and at speeds under a predetermined low speed thereof.

18. In combination, a slip coupling having its parts constantly in position for transmitting drive and including a rotatable driving member and a rotatable driven member, a centrifugal lockup device for locking said members of said slip coupling together for conjoint rotation in a drive at a predetermined speed of rotation of said driving member and a spring actuated lockup device for locking said members together in a two-way positive drive at a lower predetermined speed of rotation of said driving member.

19. In a motor vehicle having an engine, a driving structure adapted to receive drive from the engine, a driven structure adapted to receive drive from the driving structure for driving the vehicle; a slip coupling for drivingly connecting said structures with slip therebetween during drive of the vehicle by the engine, said slip coupling having its parts constantly in position for transmitting drive and centrifugally releasable positive clutching means wholly within said coupling operable to positively connect said structures in parallel with said slip coupling for a two-way positive drive when the engine is dead and the vehicle is set in motion.

20. In a motor vehicle having an engine, a driving structure adapted to receive drive from the engine, a driven structure adapted to receive drive from the driving structure for driving the vehicle; an impositive coupling for drivingly connecting said structures during drive of the vehicle by said engine, said impositive coupling having its parts constantly in position for transmitting drive and a releasable positive coupling wholly within said impositive coupling for positively connecting said structures in parallel with said impositive coupling in a two-way positive drive, said positive coupling being operably responsive to engine speed and including self-motivating means operable at or above a predetermined engine speed for disengaging this coupling and means operable at or below a lower predetermined engine speed for conditioning this positive coupling for engagement.

21. In a motor vehicle having an engine, a driving structure adapted to receive drive from the engine, a driven structure adapted to receive drive from the driving structure for driving the vehicle; an impositive coupling for drivingly connecting said structures during drive of the vehicle by said engine, said impositive coupling having its parts constantly in position for transmitting drive and a releasable positive coupling wholly within said impositive coupling for positively connecting said structures in parallel with said impositive coupling in a two-way positive drive, said positive coupling including means for engaging the same when the engine is dead and the vehicle is set in motion, and self-motivating means for effecting release of said positive coupling when the engine is started.

22. In a motor vehicle having an engine; a driving structure adapted to receive drive from the engine, a driven structure adapted to receive drive from the driving structure for driving the vehicle; a slip coupling for drivingly connecting said structures with slip therebetween during drive of the vehicle by the engine, said slip coupling having its parts constantly in position for transmitting drive and a centrifugal force type device wholly within said coupling and including an element for positively connecting said structures in a positive two-way drive in parallel with said coupling, said device being driven by the engine and being operable to effect a positive connection between said structures by said element when the engine is dead and being operable in response to centrifugal force to disconnect said element at or above a predetermined engine speed.

23. In a fluid power transmitting device having impeller and runner members, a first element drivingly connected to said impeller, a second element drivingly connected to said runner, latch means driven by one of said members and radially movable to interengageably bridge said elements for drivingly connecting said members for positive conjoint operation in a two-way drive, resilient means biasing said latch means into engagement below a predetermined speed of rotation of said one member, and centrifugally responsive means operably associated with said latch means and operable to disengage said latch means at a speed above its engaging speed.

24. In a slip coupling having a driving member and a driven member, a first element drivingly connected to said driving member, a second element drivingly connected to said driven member, and a movable latch for effecting conjoint positive operation of said members in a two-way drive, said latch having a position wherein it is disengaged from both said elements and said latch having a first tooth portion for interengagement with one of said elements and a second tooth portion for interengagement with the other of said elements, one of said tooth portions being arranged and constructed to become engaged with its element before the other portion becomes engageable with the other of said elements when said latch is moved to effect said positive operation.

25. In a fluid coupling having impeller and runner members, hubs for mounting said respective members, said hubs having adjacent coaxially disposed portions, a clutch member driven by said impeller and adapted for movement from a position of disengagement relative to its hubs to engage said hub portions and lock the same together for conjoint rotation, said clutch member having tooth portions adapted to engage said runner hub and impeller hub in the order named during said engaging movement and means for effecting said engaging movement of said clutch member at or below a predetermined speed of said impeller and for effecting its disengagement at or above a predetermined speed of said impeller.

26. In a fluid power transmitting device having driving and driven members, a movable locking pawl rotatable with one of said members, said pawl and members having interengageable portions for locking said members together for conjoint rotation, said pawl having a position where it is disengaged from said members and another position where it is engaged with said members and the interengaging portions of said pawl and of said one member being further separated from each other than the interengaging portions of said pawl and the other of said members whereby when said pawl is moved to its engaged position the pawl will become first engaged with said other member and then with said one member.

27. In a fluid power transmitting device having driving and driven members, pawl engaging slots in each of said members, a movable locking pawl, a rotatable pawl carrier, a one-way coupling between said driving member and said carrier, said pawl being stepped to provide leading and follower tooth portions interengageable respectively with said slots in said driven and driving members respectively for locking said members together for conjoint rotation, said pawl having a position where it is disengaged from both said members and another position where it is engaged with both said members and the said leading tooth portion being nearer to the slot of said driven member in the disengaged position of said pawl than the follower tooth portion is to the slot of the driving portion whereby said pawl will become engaged with said slots of said driven and driving members in that order when said pawl is moved to lock said members together.

EDWIN R. MAURER.

References Cited in the file of this patent

UNITED STATES PATENTS

| Number | Name | Date |
|---|---|---|
| 1,961,426 | Morgan | June 5, 1934 |
| 2,182,404 | Maurer | Dec. 5, 1939 |
| 2,264,478 | Lowther | Dec. 2, 1941 |
| 2,267,334 | Keller | Dec. 23, 1941 |
| 2,271,919 | Jandasek | Feb. 3, 1942 |
| 2,275,046 | Harris | Mar. 3, 1942 |
| 2,360,710 | Nutt et al. | Oct. 17, 1944 |